United States Patent [19]

Degi et al.

[11] Patent Number: 5,719,965
[45] Date of Patent: Feb. 17, 1998

[54] HIGHER PRECISION LOOK-UP TABLE FROM LOWER PRECISION LOOK-UP TABLE FOR IMPROVED TONAL ADJUSTMENT

[75] Inventors: Greg A. Degi, Fort Collins; Robert G. Gann, Bellvue; Steven L. Webb, Loveland, all of Colo.

[73] Assignee: Hewlett-Packard Company, Palo Alto, Calif.

[21] Appl. No.: 354,564

[22] Filed: Dec. 13, 1994

[51] Int. Cl.$^6$ .............................. G06K 9/40; G03B 3/00; H04N 1/407
[52] U.S. Cl. .................. 382/254; 358/504; 358/523; 364/577; 348/674
[58] Field of Search ...................... 345/147, 155; 348/674, 678; 358/461, 525, 504; 382/254, 274, 300

[56] References Cited

U.S. PATENT DOCUMENTS

| | | | |
|---|---|---|---|
| 4,346,402 | 8/1982 | Pugsley | 358/523 |
| 4,901,258 | 2/1990 | Akiyama | 364/577 |
| 5,196,937 | 3/1993 | Kageyama | 348/674 |
| 5,221,971 | 6/1993 | Allen | 358/459 |
| 5,260,873 | 11/1993 | Hishinuma | 364/413 |
| 5,287,418 | 2/1994 | Kishida | 382/254 |
| 5,305,119 | 4/1994 | Rolleston | 358/523 |
| 5,321,797 | 6/1994 | Morton | 395/127 |
| 5,381,246 | 1/1995 | Suzuki | 358/523 |
| 5,452,112 | 9/1995 | Wan et al. | 358/504 |
| 5,502,580 | 3/1996 | Yoda | 358/523 |

FOREIGN PATENT DOCUMENTS

| | | | |
|---|---|---|---|
| 0376595 | 7/1990 | European Pat. Off. | 1/40 |
| 0525359A2 | 2/1993 | European Pat. Off. | 15/68 |
| 0583898 A2 | 2/1994 | European Pat. Off. | 15/68 |
| 0599099A1 | 6/1994 | European Pat. Off. | . |
| 0620678A1 | 10/1994 | European Pat. Off. | 1/40 |

*Primary Examiner*—Dwayne Bost
*Assistant Examiner*—Brian L. Johnson

[57] ABSTRACT

An image capture system comprising a scanner having a 10-bit analog-to-digital converter. The scanner operates within an environment that includes a host computer that is configured to accept 8-bit data. The contrast enhancement of the scanner is improved by applying an improved tonal adjustment on a scanned image. The host computer connected to the scanner provides an 256-value to 256-value look-up table (i.e., the 8-bit tone map) to the scanner. The scanner generates an interpolated 1024-level to 256-level look-up table (i.e., a 10-bit tone map) from the 256-level to 256-level look-up table. The 1024-value to 256-value look-up table is generated by using linear interpolation and extrapolation. The scanner can thus provide better contrast enhancements without having to modify the software running on the host computer.

16 Claims, 2 Drawing Sheets

HIGHER PRECISION LOOK-UP TABLE FROM LOWER PRECISION LOOK-UP TABLE FOR IMPROVED TONAL ADJUSTMENT

BACKGROUND OF THE INVENTION

1. Field of the Invention

The present invention relates generally to the field of optical scanners and, more particularly, to a system and method for applying a tonal adjustment to a scanned image.

2. Discussion of Related Art

Optical scanners are used to capture and digitize images. For example, an optical scanner can be used to capture the image of printed matter on a sheet of paper. The digitized image can then be electronically stored and/or processed with character recognition software to produce ASCII text. The typical optical scanner includes a light source, a linear array of photoelectric sensing elements (generally a CCD sensor), an analog amplifier, an analog-to-digital converter (ADC), a controller and a random access memory (RAM).

The CCD sensor includes a large number of (e.g., 2000) photoelectric sensing elements arranged in a linear array. Each photoelectric sensing element captures light representing a single pixel of the image. The array captures a line of pixels. By moving the CCD sensor array across a document, the entire document can be scanned one line at a time.

The term "image light" is used herein to refer to light incident upon the CCD sensor. The image light may be reflected from a document (or other object) or may be transmitted through the document. In either case, the light from the document, incident on the CCD sensor, is known as image light. The conversion into digital signals of image light reflected from or transmitted through the document takes place in essentially three steps. First, each photoelectric sensing element converts the light it receives into an electric charge. The magnitude of the charge depends on the intensity of the light and the exposure time. Second, the charges from each of the photoelectric sensing elements are converted into analog voltages via the analog amplifier. Finally, the analog voltages are digitized by the analog-to-digital converter for digital image processing and storage in the RAM.

In image scanning, one of the factors that impacts the tonal resolution and the resultant image quality from the scanner is the scanner's "white intercept" or "white point." The white intercept is the intensity of image light that results in a full scale output from the analog-to-digital converter of the scanner. For example, a scanner having an 8-bit analog-to-digital converter will return a maximum value of 255 if the image light has an intensity at or above the white intercept. Image light having an intensity 50% of the white intercept will cause the 8-bit ADC to return a value of 128.

Similar in concept is the "black intercept" or "black point." The black intercept is the intensity of the image light at which the analog-to-digital converter of the scanner will return a value of zero (excluding noise). The bit depth of the analog-to-digital converter and the difference between the white and black intercepts will determine the tonal resolution of a scanner in reflectance or transmittance space. For ease of discussion, only reflectance is discussed herein. However, a person skilled in the relevant art will recognize that the invention has equal applicability to a scanner using transmittance.

Each pixel within a display has an associated intensity. Typically, the intensity of a pixel can have one of 256 different intensity values. The object of using 256 intensity values is to reproduce a continuous-tone black and white image such that the reproduction appears to be continuous. Oftentimes, however, a majority of a scanned image does not utilize one side of reflectance space. For example, a very dark image (e.g., an image comprising a majority of the pixels having 0% to 50% reflectance) does not fully utilize the values set aside for regions of the image having 80% to 100% reflectance. That is, since the intensity values are linearly spaced, the same amount of intensity values are set aside for the dark regions as for the light regions.

It is thus deskable to stretch the brightness sensitivity in some parts of the reflectance space (e.g., the dark regions) and to make corresponding compression in other parts of the reflectance space (e.g., light regions). This is referred to as tonal adjustment. One example of this is a "gamma correction" in which reflectance space is remapped with a power curve. This curve has the property of increasing the contrast in dark areas and decreasing contrast in the light areas. This is often done with a look-up table. For example, an 8-bit scanner uses an 8-bit to 8-bit look-up table to re-map each of 256 intensity values to a new value again spread over 256 levels. However, since adjacent levels in areas that are being stretched will now be mapped into output levels that are separated by most likely a few levels, several possible output levels will now be skipped which can cause objectionable contouring effects in the image that was scanned.

Additionally, the black intercept of a scanner is limited by noise, stray light, and CCD sensitivity. The white intercept is typically the result of design or calibration factors and is determined, for example, by the gain of the analog amplifier, the optical f-stop of the scanner optics, and the intensity of the lamp used in the scanner. After accounting for these factors, conventional scanners may set the white intercept to as near 100% reflectance as possible. This may appear optimal. However, in typical image scanning, most images have no regions where reflectance approaches 100% (even a white sheet of paper may not result in 100% reflectance depending on the lamp, optics and gain of the scanner). In fact, many images will have a maximum reflectance of less than 80%. For a scanner with a 100% white intercept and a maximum reflectance of less than 80%, 20% of the available analog-to-digital levels are never used. Consequently, scanned images, particularly dark ones, suffer from quantization effects due to the limited number of analog-to-digital levels used in the scan.

Thus, a tonal adjustment can also be used to adjust a scanned image having a maximum reflectance less than 100% and a minimum reflectance above 0%. For example, a scanner having a minimum reflectance of 40% and a maximum reflectance of 60% that does not use a tonal adjustment would result in digitized values ranging from 100 to 150. If a tonal adjustment is applied, the minimum reflectance of 40% (original digitized value 100) would be mapped to 0 and the maximum reflectance of 60% (original digitized value 150) would be mapped to 255. The original digitized value of 101, 102, and 103 might be mapped, for example, to 5, 10, and 15, respectfully. Obviously this creates gaps between the individual mapped values (e. g., between 5 and 10). This, in turn, produces a very rough contour over the entire image.

A conventional approach to compensate for the above problems is to increase the resolution of the analog-to-digital converter by providing additional bits per pixel. For example, an 8-bit analog-to-digital converter might be replaced with a 10-bit analog-to-digital converter. However, if the scanner is driven by older software that still relies on 256-level to 256-level (i.e., 8-bit) remapping, the scanner cannot provide the benefit of the increased levels of resolution.

SUMMARY OF THE INVENTION

An image capture system comprising a scanner having a 10-bit analog-to-digital converter. The scanner operates within an environment that includes a host computer that is configured to accept 8-bit data. The contrast enhancement of the scanner is improved by applying an improved tonal adjustment on a scanned image. That is, the scanner uses the tonal adjustment to enhance the contrast in dark regions of the scanned image and to decrease the contrast in light regions of the scanned image.

The host computer connected to the scanner provides an 8-bit tone map to the scanner. The scanner generates an interpolated 1024-level to 256-level look-up table (i.e., a 10-bit tone map) from a 256-level to 256-level look-up table (i.e., the 8-bit tone map). The 1024-value to 256-value look-up table is generated by using linearly interpolation and extrapolation. The scanner can thus provide better contrast enhancements without having to modify the software running on the host computer.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE INVENTION

The preferred embodiment of the invention is discussed in detail below. While specific part numbers and/or configurations are discussed, it should be understood that this is done for illustration purposes only. A person skilled in the relevant art will recognize that other components and configurations may be used without parting from the spirit and scope of the invention.

The preferred embodiment of the invention is now described with reference to the figures where like reference numbers indicate like elements. Also in the figures, the left most digits of each reference number correspond to the figure in which the reference number is first used.

Figure 1:
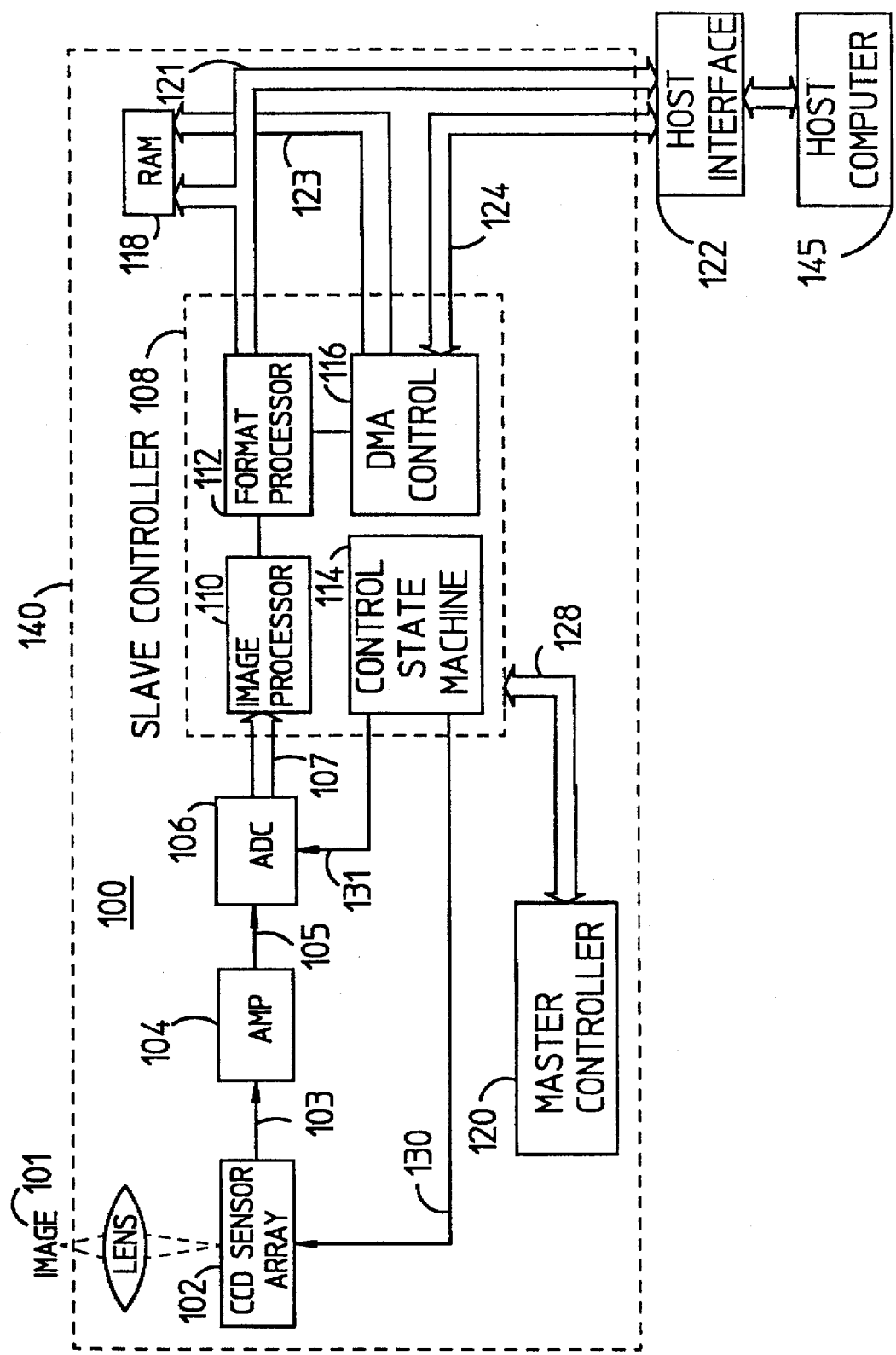
FIG. 1 is a high level block diagram of an image capture system that implements the present invention.

FIG. 1 is a high level block diagram of an image capture system 100 of the invention. Image capture system 100 includes a scanner 140 connected to a host computer 145. Image capture system 100 may be used with an optical scanner such as that described in commonly owned U.S. Pat. No. 4,926,041 to Boyd, the full text of which is incorporated herein by reference as if reproduced in full below.

Image capture system 100 includes a CCD (charge coupled device) sensor 102, an analog amplifier 104, an analog-to-digital converter (ADC) 106, a slave controller 108, a master controller 120, a random access memory (RAM) 118 and a host interface 122. CCD sensor 102 includes a linear array of photoelectric sensing elements (e.g., light sensitive diodes). Each element is configured to capture a pixel of an image 101 and to produce an electrical charge corresponding to the intensity of light received. The amount of charge stored in the photoelectric sensing elements is a function of how much light is hitting the photoelectric sensing elements and the time of exposure to the light.

Analog amplifier 104 is configured to receive a serial stream of charges from CCD sensor 102 over a line 103 and to sequentially convert each charge to an analog voltage. ADC 106 is configured to receive the analog voltage from amplifier 104 over a line 105 and to digitize the analog voltage.

In a preferred embodiment, ADC 106 outputs a 10-bit digital word representing the varying gray scale of the pixel represented by the received voltage. That is, ADC 106 produces a digital signal that has a spectrum of 1024 levels that are linearly spaced in reflectance space. As a consequence, ADC 106 provides an increased level of resolution by providing additional bits per pixel. That is, ADC 106 provides an increased level of resolution relative to an image capture system that utilizes an 8-bit ADC.

Slave controller 108 controls the timing of CCD sensor 102 and ADC 106 over control lines 130 and control lines 131. Slave controller 108 receives the digitized data from ADC 106 over bus 107, provides any required formatting and/or image processing and stores the digitized data in RAM 118 via bus 121. In addition, slave controller 108 manages the transfer of data from RAM 118 to a host computer 145 via host interface 122. Host computer 145 may be an image processing system or general purpose computer. Master controller 120 is provided to initiate an image scanning operation and to set up and supervise slave controller 108 via bus 128.

Slave controller 108 includes an image processor 110, a format processor 112, a control state machine 114 and a direct memory access (DMA) controller 116. Control state machine 114 provides clocking and other control signals to synchronize the operation of CCD sensor 102 via control lines 130 and ADC 106 via control lines 131. Control state machine 114 also controls the scanning of CCD sensor 102 across the image 101.

DMA controller 116 controls the storage and removal of data from RAM 118. DMA controller 116 communicates with RAM 118 via bus 123 and with host interface 122 via bus 124. Image processor 110 provides image processing capabilities to image capture system 100. For example, image processor 110 may alter the resolution of the digitized image from ADC 106. Format processor 112 allows the data format of the digitized image to be changed prior to being stored in RAM 118 via bus 121. For example, format processor 112 may present the data representing the digitized image to RAM 118 in 1, 4, or 8 bits per pixel format. Format processor 112 also communicates with the host computer 145 via bus 121.

Exchange of data between RAM 118 and the host computer 145 via bus 121 is discussed in detail in commonly owned U.S. Pat. No. 5,239,387 to Stein et al., the full text of which is incorporated herein by reference as if reproduced in full below.

In the preferred embodiment, slave controller 108 is implemented as an ASIC (application specific integrated circuit. Master controller 120 is a general purpose microprocessor such as a Motorola 68HC11, available from Motorola, Inc.., Schaumburg, Ill. CCD sensor 102 is a Toshiba TCD137C, available from Toshiba America Electronic Components, Inc., Irvine, Calif.

The present invention provides an improvement to scanner 140. Scanner 140 provides a tonal adjustment that can take advantage of the 10-bit value produced by ADC 106. Generally, scanner 140 produces a 1024-level to 256-level look-up table. This look-up table is applied by image processor 110 to the digitized image 107. That is, a tonal adjustment is applied to the digitized image 107. Provided below is a detailed description of the present invention.

An entirely white portion of image 101 (i.e., a portion of image 107 that reflects one hundred percent of the light that hits it and absorbs none of the light) is referred to as having one hundred percent (100%) reflectance. The digital value produced by ADC 106 for an area of a picture having one hundred percent reflectance is 1023. A gray area that has fifty percent reflectance reflects fifty percent of the light and absorbs fifty percent of the light. The digital value produced by ADC 106 for a gray area having a 50% reflectance is 512. The digital value produced by the ADC 106 for a black area having zero percent reflectance is zero.

The human eye is much more sensitive to objects in the dark areas of image 101 as opposed to objects in the light areas of image 101. In fact, the human eye is exponentially sensitive to reflectance in image 101. Thus, conventional scanners use a tonal adjustment when scanning an image; particularly an image having a lot of detail in the dark regions. As described above in the Background Section, a tonal adjustment can be the application of a logarithmic curve to the pixel charges stored in CCD 102. The tonal adjustment artificially expands the differences in the dark regions and compress the differences in the light regions. This has the effect of bringing out the detail that would normally be hidden in the dark regions (e.g., a shadow) of the image 107.

A tonal adjustment is also used to adjust a scanned image of a picture having mostly gray regions (i.e., very few light and dark regions). For example, most monitors or printers do not have a linear response in reflectance space. In this scenario, the tonal adjustment would be used to expand the gray region of the picture. Thus, the limited number of digital values available to represent image 107 would not be wasted on the few light and dark regions.

In both of the above scenarios, the tonal adjustment utilizes a look-up table (also referred to as a tone map). The look-up table assigns a new digital value for each digital value produced by ADC 106.

In a preferred embodiment, ADC 106 converts the pixel charges stored in CCD 102 into a ten bit value; thus, the stored pixel charges have a potential of 1024 different levels. In order to fully appreciate the benefits of the 10-bit scanner 140 (that is, a scanner that includes a 10-bit ADC) within an image capture system that is adapted to receive 8 bit data, a 1024-level to 256-level tone map must be used. Conventional host computers 145, however, are not adapted to be interfaced with a 10-bit scanner. Rather, they are adapted to interface with an 8-bit scanner. As a result, host computer 145 includes software that is adapted to provide a 256-level to 256-level look-up table (also referred to herein as an 8-bit tone map or look-up table) to scanner 140. That is, host computer 145 does not generate a 1024-value to 256-value look-up table (also referred to herein as a 10-bit tone map or look-up table).

The present invention overcomes this deficiency with the host computer 140 by modifying the software running within scanner 145: Specifically, the image processor 110 is adapted to use an interpolation algorithm to generate a 1024-value to 256-value look-up table from the 256-value to 256-value look-up table provided by host computer 140. Thus, the present invention improves the contrast enhancement of scans without requiring software in the host computer 140 to be modified. That is, the present invention allows the host computer 145 to continue to perform a tonal adjustment without having to know that it is connected to a 10-bit scanner 140 (as opposed to an 8-bit scanner).

Figure 2:
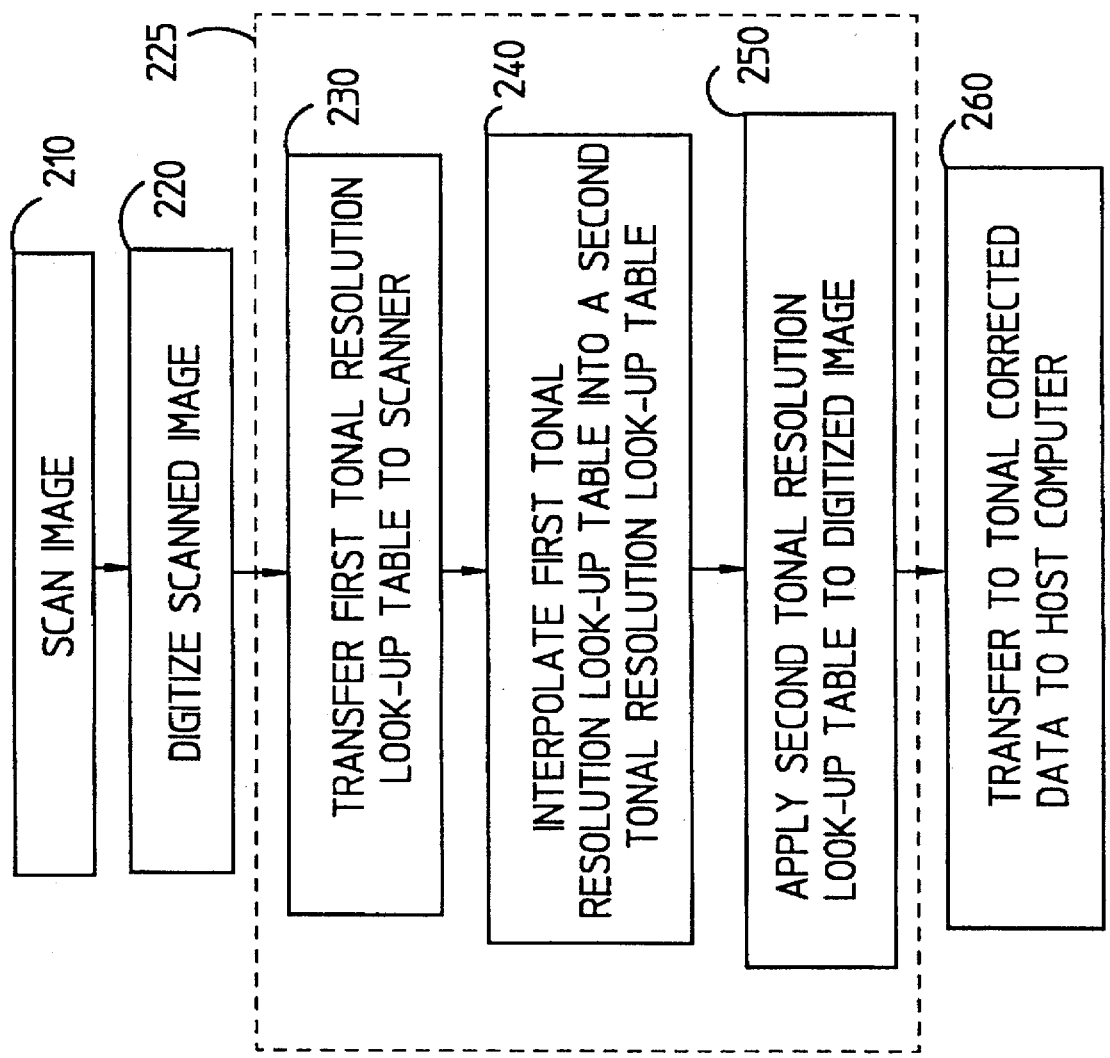
FIG. 2 is an operational flow chart illustrating the present invention.

FIG. 2 illustrates an operational flow chart of scanning an image including application of the present invention. As shown in block 210, image 101 is initially scanned. The charges stored in CCD 102 are digitized using ADC 106 to produce a 10-bit value. This is shown in block 220. Block 225 details the operation of the present invention.

Host computer 145 downloads a 256-level to 256-level look-up table that maps eight bit pixel values across the 256 values used to represent pixels in image 101. This is shown in block 230. Stated generally, a first tonal resolution look-up table (or lower precision look-up table) is downloaded to scanner 140. Tonal resolution is defined as the ability to resolve between subtle differences in reflectance or transmittance.

The present invention utilizes the downloaded first tonal resolution look-up table to generate a 1024-level to 256-level look-up table. The present invention uses linear interpolation to generate the 1024-level to 256-level look-up table, as shown in block 240. Stated generally, the first tonal resolution look-up table is used to generate a second tonal resolution look-up table (also referred to as a higher precision look-up table).

TABLE 1

| Input | 10-bit to 8-bit Look-up Table | 8-bit to 8-bit Look-up Table | Interpolated Look-up Table |
|---|---|---|---|
| 0 | 0 | 0 | 0 |
| 1 | 26 | 0 | 15 |
| 2 | 40 | 0 | 30 |
| 3 | 51 | 0 | 44 |
| 4 | 59 | 59 | 59 |
| 5 | 66 | 59 | 65 |
| 6 | 72 | 59 | 70 |
| 7 | 77 | 59 | 76 |
| 8 | 81 | 81 | 81 |
| 9 | 85 | 81 | 84 |
| 10 | 88 | 81 | 88 |
| 11 | 91 | 81 | 91 |
| 12 | 94 | 94 | 94 |
| • | • | • | • |
| • | • | • | • |
| • | • | • | • |
| 1023 | 255 | 255 | 255 |

Table 1 has four columns. The following is a description of the four columns.

The first column shows the input code used as an input to the present invention. This input is produced by the 10-bit ADC 106. Thus, this input ranges from 0 to 1023. ADC 106 produces this input based on values stored in CCD 102.

The second column is the ideal logarithmic tone map for a 1024-value to 256-value look-up table. The values found in column two are generated based on the equation:

$$\text{tone map value} = \ln(\text{input code} + 1) * 36.8. \tag{1}$$

This equation gives 0 for input code 0 and 255 for input code 1023. Column three is representative of the downloaded 256-value to 256-value look-up table with the missing values fried in by replicating the previous value. Column four is the result of application of the present invention. The look-up table illustrated in column four is a close approximation to the ideal logarithmic tone map shown in Column two. Image processor 110 applies the values in column four (i.e., the 1024-value to 256-value look-up table) to data produced by scanner 140 to produce adjusted data (tonally adjusted data). The adjusted data is returned to the host computer 145.

Column four is generated by linearly interpolating between every fourth value in column three. This is shown in block 240. Stated generally, interpolation is used to generated a second tonal resolution look-up table from the first tonal resolution look-up table. For example, column three has a value of 0 for inputs 0, 1, 2 and 3, and a value of 59 for input value 4. This gap produced by input values 1, 2 and 3 having the value 0 and input value 4 having a value of 59 contributes to the scanned image having a very rough contour. The present invention improves the contour of the scanned image by applying a tonal correction. Thus, the difference between 0 and 59 is divided by 4. This value (approximately 15) is used to generate the interpolated values in column four for input value 1–3. This is referred to as linear interpolation.

Extrapolation is used at the end of the look-up table. For example, assume that the 256-value to 256-value look-up table has the value 246 for input value 254 (which maps to value 1016 in 10-bit space) and 250 for input value 255 (which maps to value 1020 in 10-bit space). Extrapolation would be used to generate values for input values 1021–1023. Accordingly, the present invention extrapolates the slope between the last two entries. Given the example above, the slope between 1016 and 1020 would be used to generate new values for input values 1021–1023. These new input values would be used in the 1024-level to 256-value look-up table. Note that extrapolation could also be used for values at the beginning of the look-up table as should be readily apparent to a person skilled in the relevant art.

Stated generally, the remapping table (i.e., second tonal resolution table) is generated by first linearly interpolating between table entries, wherein table entries to be generated are bracketed by entries from the original table (i.e., first tonal resolution table); second, when necessary, extrapolating the slope between the last two entries in the original table to generate entries for the remapping table needed beyond the last entry in the original table.

In block 250, the second tonal resolution look-up table (i.e., the 1024 level to 256 level look-up table—shown, for example, in column 4 of Table 1) is applied to the digitized image. This tonally corrected data is then transferred to the host computer 145, as shown in block 260. The present invention thus allows the scanner 140 to benefit from the increased levels of tonal resolution available.

Note that other methods of generating a 10-bit to 8-bit tone map are contemplated by the present invention. Those skilled in the art will readily appreciate the various methods that can be used by scanner 130 to generate a 10-bit to 8-bit tone map. Furthermore, the present invention is scalable to other size tone maps. That is, the present invention contemplates generation of other size tone maps to compensate for host computers that have not yet adapted to larger as scanning technology advances, present day technology.

While the invention has been particularly shown and described with reference to preferred embodiments thereof, it will be understood by those skilled in the art that various changes in form and details may be made therein without departing from the spirit and scope of the invention.

What is claimed is:

1. A method for improving the contrast enhancement of a scanned image, comprising the steps of:

scanning each pixel of an image using a scanner having a plurality of photoelectric sensing elements to produce analog values representative of the intensity of each pixel within said image;

converting said analog values into digital values;

transferring a first tonal resolution look-up table from a host computer to said scanner;

generating a second tonal resolution look-up table from said first tonal resolution look-up table within said scanner whereby said second tonal resolution look-up table, which provides improved contrast enhancement of the scanned image in relation to said first tonal resolution look-up table is generated without having to modify software within said host computer; and applying said second tonal resolution look-up table to said digital values to produce tonally corrected values.

2. The method of claim 1, wherein said generating step further includes the step of fusing interpolation to generate said second tonal resolution look-up table.

3. The method of claim 2, wherein said generating step further includes the step of using extrapolation to generate portions of said second tonal resolution look-up table.

4. The method of claim 1, further comprising the step of storing said tonally corrected values.

5. The method of claim 1, further comprising the step of transferring said tonally corrected values to said host computer.

6. An image capture system comprising:

a charge coupled device sensor configured to be passed over an image and produce a plurality of charges in response to light incident thereon;

amplifier means for receiving said charges and for converting said charges to analog voltages;

digitizer means for digitizing said analog voltages to produce digitized voltages;

an image processor configured to accept a first tonal resolution look-up table from a host computer and to generate a second tonal resolution look-up table therefrom, wherein said second tonal resolution look-up table is used to tonally correct said digitized voltages.

7. The system of claim 6, wherein said second tonal resolution look-up table is used to enhance the contrast in dark areas of said image and decrease the contrast in light areas of said image.

8. The image capture system of claim 6, wherein said image processor is further configured to generate said second tonal resolution look-up table using interpolation.

9. The image capture system of claim 6, wherein said image processor is further configured to generate portions of said second tonal resolution look-up table using extrapolation.

10. The image capture system of claim 6, further comprising a random access memory (RAM) for storing said tonally correct digitized values.

11. A system for improving the contrast enhancement of a scanned image, comprising:

a host processor having a memory for storing a first tonal resolution look-up table; and an image capture system, connected to said host processor, that scans an image and produces a digitized image therefrom, said image capture system including means for generating a second tonal resolution look-up table from said first tonal resolution look-up table received from said host processor, wherein said second tonal resolution look-up table is applied to said digitized image to produce a tonally corrected digitized image.

12. The system of claim 11, wherein said tonally corrected digitized image is transferred to said host processor.

13. The system of claim 11, wherein said image capture system comprises:
- a charge coupled device sensor configured to be passed over said image and produce a plurality of charges in response to light incident thereon;
- an analog amplifier that receives said charges and that converts said charges into analog voltages; and
- an analog-to-digital converter that digitizes said analog voltages to produce digitized voltages representative of said digitized image.

14. The system of claim 11, wherein said second tonal resolution look-up table is used to enhance the contrast in dark areas of said image and decrease the contrast in light areas of said image.

15. The system of claim 11, wherein said image capture system is further configured to generate said second tonal resolution look-up table using interpolation.

16. The system of claim 11, wherein said image capture system is further configured to generate portions of said second tonal resolution look-up table using extrapolation.

* * * * *

UNITED STATES PATENT AND TRADEMARK OFFICE
CERTIFICATE OF CORRECTION

PATENT NO. : 5,719,965  
DATED : February 17, 1998  
INVENTOR(S) : Greg A. Degi, Robert G. Gann, and Steven L. Webb Page 1 of 1

It is certified that error appears in the above-identified patent and that said Letters Patent is hereby corrected as shown below:

IN THE SPECIFICATION

Column 3,
Line 20: "linearly" should read –linear—

IN THE CLAIMS

Column 8,
Line 8: "scanner whereby" should read –scanner, whereby—
Line 11: "table is" should read –table, is—
Line 12: "modify software" should read –modify contrast enhancement software--

Signed and Sealed this

Third Day of July, 2001

*Attest:*

NICHOLAS P. GODICI
*Attesting Officer*    *Acting Director of the United States Patent and Trademark Office*